W. B. McLAUGHLIN.
METHOD FOR DESICCATING FLUID SUBSTANCES.
APPLICATION FILED APR. 3, 1911.
1,090,740.
Patented Mar. 17, 1914.
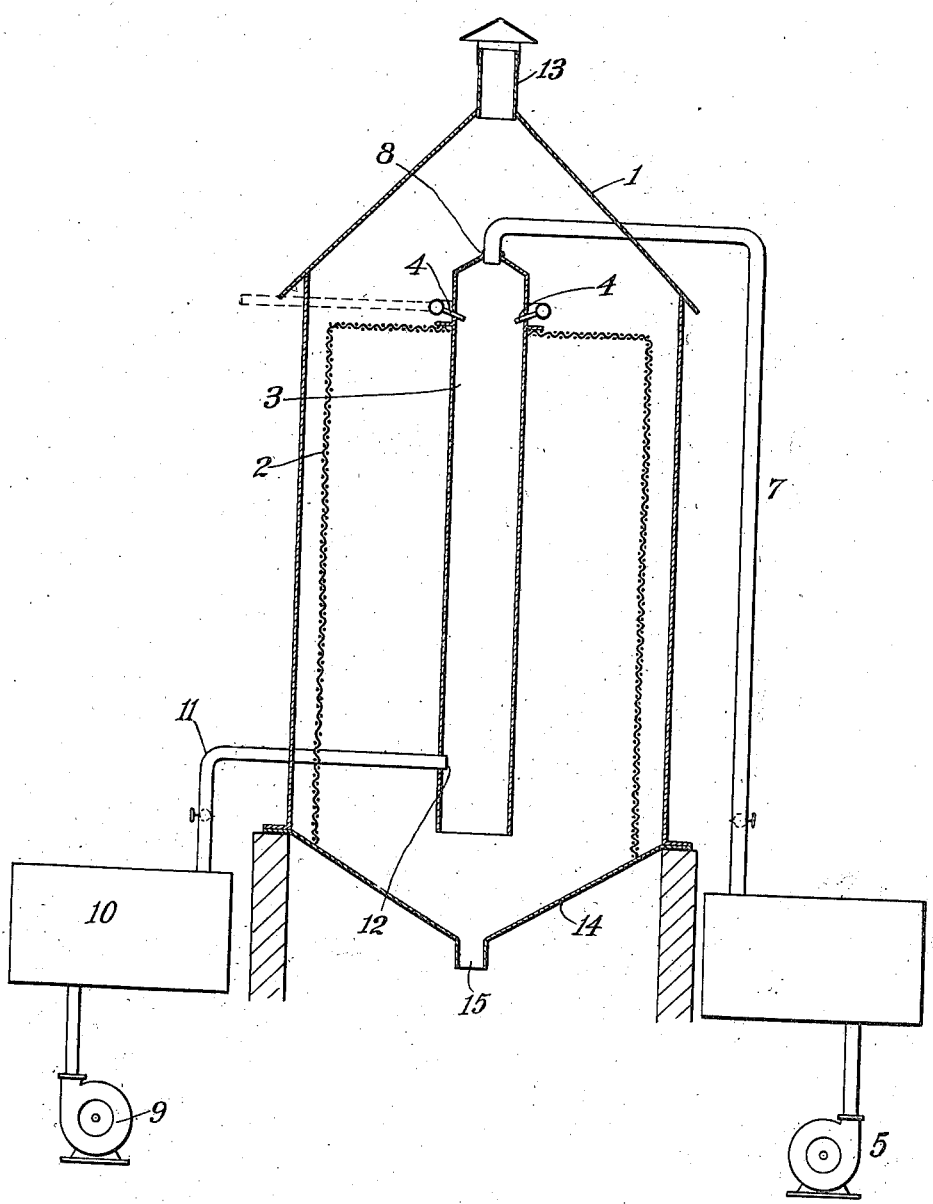

UNITED STATES PATENT OFFICE.

WHARTON B. McLAUGHLIN, OF NEW YORK, N. Y.

METHOD FOR DESICCATING FLUID SUBSTANCES.

1,090,740.

Specification of Letters Patent. Patented Mar. 17, 1914.

Application filed April 3, 1911. Serial No. 618,766.

*To all whom it may concern:*

Be it known that I, WHARTON B. McLAUGHLIN, a citizen of the United States, residing at 1047 Stebbins avenue, in the city of New York, county of New York, State of New York, have invented new and useful Improvements in Methods for Desiccating Fluid Substances, of which the following is a specification.

This invention relates to the process of extracting the aqueous content from fluid-substances and delivering the dry solids in the form of an impalpable powder.

The methods of desiccation heretofore in use have been open to various objections among which is the fact that the product has not been delivered in the form of amorphous powder, except when the speed of the operation of the apparatus was sacrificed. In my invention which is peculiarly and particularly applicable to the drying of milk, the milk is rapidly dried and the product obtained is chemically unchanged and in the form of a fine amorphous powder: reference to be had in the accompanying drawing which, while strictly diagrammatic, fully illustrates my process.

1 is a tower, lined with cloth 2, in the center of the tower is the drying chamber, 3, into which the substance to be dried is delivered in the form of a fine spray at 4; air is delivered from the blower 5 through the heating chamber 6, in which it is brought to a temperature exceeding 212° F., and is delivered by pipe 7 into the top of the drying tube 8; the air delivered by the blower 9 through the heating chamber 10 where it is sufficiently warmed is delivered through the pipe 11 into the drying tube 3 at the point 12.

In practice, I have found that the air delivered to the top of the drying tube is preferably about the temperature of 300° F. and the air delivered into the drying tube through pipe 11, must be heated according to the outside temperatures and while sufficiently hot to prevent a precipitation of the watery vapor contained in the drying chamber 3, it must be sufficiently cool to rapidly reduce the temperature in the tube 3 to a point at which the dry product will not be injured: the amount of air delivered by the tube 11 must be sufficient to furnish absorptive capacity for all the aqueous vapor in the chamber 3 at the temperature to which the air is reduced. It is evident that the material sprayed into the drying chamber by the sprays 4 on coming in contact with an air of 300° F. would rapidly lose its watery content and that if the fall from the sprays to the entrance of the air pipe 11 be properly regulated, the air would be cooled just at the moment of completing the drying and burning of the product prevented. The air containing the vapor of water would pass out from the cloth 2 and to the outside air through the ventilating pipe 13, while the solid material would collect in the hopper 14 and by gravity fall into the box 15.

Having now fully described my invention which I claim is new and on which I desire to secure my Letters Patent—

1. The method of desiccating liquids which consists in spraying the liquid to be dried into a current of gas at a temperature exceeding 212° F. with means for rapidly cooling said gas when desiccation is completed.

2. The method of desiccation which consists in spraying the substance to be desiccated into a current of heated gas and upon the completion of desiccation rapidly reducing the temperature by the injection into the current of another current of cooler gas.

3. The method of desiccation which consists in spraying the material to be desiccated into a current of heated gas and subsequently rapidly cooling this gas without precipitating the moisture contained therein.

4. The method of desiccating liquids containing solids which are subject to chemical change at certain temperatures, which consists in spraying the liquid to be desiccated into a body of gas at a temperature above that at which the solids would be chemically altered, and effecting the cooling of said gas to a temperature below that at which the solids would be chemically altered before the desiccation is completed.

5. The method of desiccation which consists in subjecting the material to be desiccated in the form of a spray to the action of a current of gas at a temperature exceeding 212° F., and thereafter, before the desiccation is completed, subjecting the material to the action of a second current of gas at a temperature below 212° F.

WHARTON B. McLAUGHLIN.

Witnesses:
SOPHIA HAHN,
LAWRENCE W. ATWATER.